United States Patent [19]

Schupp et al.

[11] 4,336,116
[45] Jun. 22, 1982

[54] POLYADDUCTS CONTAINING UNSATURATED AMIDE GROUPS AND THEIR USE IN COATINGS

[75] Inventors: Eberhard Schupp, Schwetzingen; Fritz E. Kempter, Mannheim; Erich Gulbins, Heidelberg-Neuenheim, all of Fed. Rep. of Germany

[73] Assignee: BASF Aktiengesellschaft, Fed. Rep. of Germany

[21] Appl. No.: 198,226

[22] Filed: Oct. 17, 1980

[30] Foreign Application Priority Data

Oct. 20, 1979 [DE] Fed. Rep. of Germany ....... 2942488

[51] Int. Cl.$^3$ .................... C08G 59/14; C08G 59/28; C08J 3/28
[52] U.S. Cl. ......................... 204/159.11; 204/159.14; 204/181 C; 528/99; 528/104; 528/107; 564/153; 564/157; 524/901; 523/402
[58] Field of Search ................. 525/532; 528/99, 104, 528/107; 564/153, 157; 260/29.2 EP; 204/159.14, 181 C, 159.11

[56] References Cited

U.S. PATENT DOCUMENTS

| 3,312,664 | 4/1967 | Bremmer | 260/47 |
| 3,365,471 | 1/1968 | Becke et al. | 260/348 |
| 3,391,097 | 7/1968 | Williamson | 260/18 |
| 3,450,711 | 6/1969 | Megna et al. | 260/326 |
| 3,503,979 | 3/1970 | Habermeier et al. | 260/260 |
| 3,812,202 | 5/1974 | Wright | 260/834 |
| 3,839,447 | 10/1974 | Swiger et al. | 260/562 P |
| 4,188,312 | 2/1980 | Kempter et al. | 260/19 EP |
| 4,269,742 | 5/1981 | Goeke et al. | 528/99 X |

FOREIGN PATENT DOCUMENTS

| 2499 | 10/1980 | European Pat. Off. . |
| 2429527 | 1/1976 | Fed. Rep. of Germany . |
| 2606831 | 8/1977 | Fed. Rep. of Germany . |
| 2749776 | 5/1978 | Fed. Rep. of Germany . |
| 1172916 | 12/1969 | United Kingdom . |

Primary Examiner—Earl A. Nielsen
Attorney, Agent, or Firm—Keil & Witherspoon

[57] ABSTRACT

The invention concerns polyadducts and their use.

The polyadducts, possessing nitrogen-basic groups, have a mean molecular weight of from 500 to 10,000 and contain groups, attached to aromatic rings, of the general formula (I)

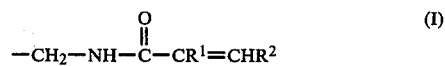

where $R^1$ and $R^2$ are identical or different and each is hydrogen or methyl.

In particular, these polyadducts are used, after protonizing with an acid, as binders for the cathodic electrocoating of metal articles.

10 Claims, No Drawings

POLYADDUCTS CONTAINING UNSATURATED AMIDE GROUPS AND THEIR USE IN COATINGS

The present invention relates to polyadducts, possessing nitrogen-basic groups and containing α,β-olefinically unsaturated amidomethyl groups, and to their use for the production of coatings, especially their use as binders for the cathodic electrocoating of metal articles.

It is known that synthetic resins which in addition to basic groups contain α,β-unsaturated carboxylic acid ester groups (as described in German Laid-Open Application DOS No. 2,429,527) may be crosslinked by polymerizing the double bonds. Such products have been proposed as cathodic electrocoating binders in, inter alia, German Laid-Open Application DOS No. 2,749,776.

A disadvantage of these products is that they contain carboxylic acid ester groups, which of course are relatively easily hydrolyzed, thereby adversely affecting the stability of the aqueous coating baths and also the corrosion protection provided by this coating on metal articles.

It is an object of the present invention to provide hydrolysis-resistant polyadducts which give coatings which provide better corrosion protection.

We have found that this object is achieved by providing polyadducts which possess nitrogen-basic groups, have a mean molecular weight of from 500 to 10,000, and contain groups, attached to aromatic rings, of the general formula (I)

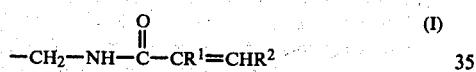

where $R^1$ and $R^2$ are identical or different and each is hydrogen or methyl.

The novel polyadducts may be prepared, for example, from monophenols and/or polyphenols which contain groups of the general formula (I), polyepoxides and amines or amine salts, the monophenols and/or polyphenols, possessing groups of the general formula (I), being, in general, reaction products of a monophenol and/or polyphenol and a compound of the general formula (II)

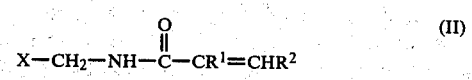

where X is OH, halogen or alkoxy of 1 to 8 carbon atoms, and $R^1$ and $R^2$ have the same meanings as in formula (I).

The present invention further relates to the use of these polyadducts for the production of coatings and in particular their use, in the protonized form obtained by addition of an acid, as binders for the cathodic electrocoating of metal articles.

Surprisingly, the introduction of α,β-olefinically unsaturated amidomethyl groups into nitrogen-basic polyadducts, and the conversion of the products, by protonization, into cathodic electrocoating resins, has provided a way of obtaining hydrolysis-resistant binders which crosslink by polymerization of carbon-carbon double bonds and which are distinguished by great stability in aqueous coating baths and by excellent corrosion protection of coatings produced therefrom.

The following details may be noted concerning the preparation of the novel polyadducts, and the components from which they are synthesized:

The monophenols and/or polyphenols, possessing α,β-olefinically unsaturated amidomethyl groups, contain, as a substituent on the aromatic nucleus, a group of the general formula

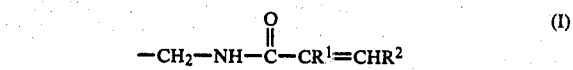

where $R^1$ and $R^2$ are identical or different and each is hydrogen or methyl. Preferred groups of the formula (I) are those where $R^1$ is hydrogen or methyl and $R^2$ is hydrogen. The monophenols and/or polyphenols, possessing such α,β-unsaturated amidomethyl groups, may be prepared from phenols or polyphenols and compounds of the formula

where X is OH, halogen, eg. chlorine, or alkoxy of 1 to 8, preferably of 1 to 4, carbon atoms, and $R^1$ and $R^2$ have the above meanings.

Suitable phenols are monophenols and/or polyphenols, but especially diphenols of the general formula

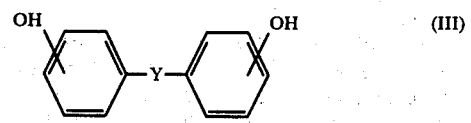

where the OH groups are in the ortho-position and/or para-position to Y, and Y is a straight-chain or branched divalent aliphatic radical of 1 to 3 carbon atoms, or is $-SO_2-$, $-SO-$, $-S-$, $-CO-$ or $-O-$; 2,2-bis-p-hydroxyphenyl-propane (bisphenol A) is preferred.

To obtain the desired molecular weight of the novel binders, it can be advantageous to replace a proportion of the diphenols by monophenols. If epoxy resins possessing more than two epoxide groups, or if polyfunctional amines, are employed for the preparation of the novel polyadducts, it is even possible to employ monophenols alone. Examples of suitable monophenols are phenol, cresols, o- and p-tert.-butylphenol, cardanol and the like. Cardonal is a natural product and consists of a mixture of long-chain 2-alkylenephenols, where alkylene is of about 13 to 17 carbon atoms, eg. 3-(pentadeca-8,11-dienyl)-phenol. As a result of the presence of these alkylene chains, the use of cardanol as one of the components gives binders with which particularly resilient coatings can be produced.

The reaction of the phenols with the compounds of the formula (II) may be carried out over a wide temperature range, advantageously in the presence of a solvent, eg. toluene, xylene, isobutanol, ethylglycol, ethylhexanol and the like.

If a strong acid, eg. HCl, is used as the catalyst, the reaction can be carried out at about 0° C., whilst with more weakly acidic catalysts temperatures of up to about 160° C. may be necessary. Particularly reactive compounds of the formula (II), eg. N-methylolacrylamide or N-methylolmethacrylamide, may even be reacted with certain phenols without a catalyst. Further-more it is possible to carry out the preparation of the compound of the formula (II), and its reaction with the particular phenol, in situ. For example, acrylamide, paraformaldehyde and 2,2-bis-p-hydroxyphenyl-propane may be reacted in isobutanol, in the presence of toluenesulfonic acid, to give the corresponding diphenol possessing an α,β-olefinically unsaturated amidomethyl group. The small amounts of methylene-bisacrylamide formed at the same time do not interfere, since they also contribute to the crosslinking reaction under baking conditions.

The reaction of phenols with compounds of the formula (II) leads to elimination of HX, and amidomethylation of the aromatic nucleus of the phenol. Such reactions are known as Tcherniac-Einhorn reactions. The reaction of 2,2-bis-p-hydroxyphenyl-propane with N-methylolacrylamide in glacial acetic acid, with HCl as the catalyst, is described in U.S. Pat. No. 3,839,447. The diphenols, possessing α,β-olefinically unsaturated amidomethyl groups, which are obtained by this method may be used to prepare the novel polyadducts. By carrying out the reaction in the presence of, for example, N-methylol-long-chain fatty acid amides, groups which increase the flexibility of the product can, in a simple manner, be attached to the phenols.

From 0.3 to 2.5 moles of the compound of the formula (II) may be employed per equivalent of the phenol, ie. per phenolic OH group. In general, however, from 0.5 to 1.5 moles per equivalent of phenol suffice to give optimum density of crosslinking in the finished coating film.

Suitable polyepoxide compounds are all conventional epoxy resins, eg. the diglycidyl ethers of bisphenol A, which may be prepared, for example, from bisphenol A and epichlorohydrin in the presence of an alkali. The polyglycidyl ethers, of molecular weight 180-2,500, of polyhydric alcohols, eg. those of pentaerythritol, glycerol, trimethylolpropane, ethylene glycol, diethylene glycol, polyoxyethylene glycols and polyoxypropylene glycols of molecular weight from 200 to 2,000, and other polyhydric, preferably dihydric, trihydric or tetrahydric, alcohols may also be used.

Other suitable polyepoxide compounds are nitrogen-containing diepoxides, as described in U.S. Pat. No. 3,365,471, epoxy resins obtained from 1,1-methylene-bis-(5-substituted hydantoin) as described in U.S. Pat. No. 3,391,097, diepoxides of bis-imides, as described in U.S. Pat. No. 3,450,711, epoxidized aminomethyl-diphenyl ethers, as described in U.S. Pat. No. 3,312,664, heterocyclic N,N'-diglycidyl compounds as described in U.S. Pat. No. 3,503,979, aminoepoxyphosphates as described in British Patent No. 1,172,916, and 1,3,5-triglycidyl isocyanurates and other industrially well-known materials which contain epoxide groups, eg. dicyclopentadiene dioxide, limonene dioxide and epoxidized butadiene oils.

Polyacrylates possessing epoxide groups are also suitable polyepoxide compounds for the preparation of the novel polyadducts. These resins may for example be prepared by copolymerizing an unsaturated epoxide-containing monomer, eg. glycidyl acrylate or glycidyl methacrylate, with one or more other unsaturated monomers.

A proportion of monoepoxide compounds may also be used, if this is desirable for, for example, adjusting the molecular weight of the binder. Glycidyl esters of long-chain carboxylic acids, eg. ®Cardura E from Shell, or glycidyl ethers of long-chain alcohols, may be used if the binder is to be plasticized, thereby giving more resilient coatings.

The amine or amine salt to be used according to the invention may be any primary or secondary amine, for example of the general formula $H_2N-R^3$ or

where $R^3$ and $R^4$ are identical or different alkyl of 1 to 18 carbon atoms or are ethanol or isopropanol radicals or together form a 5-membered or 6-membered ring. A tertiary amine salt may also be used, in which case binders containing quaternary ammonium groups are obtained.

Examples of primary or secondary amines which may be employed are monoalkylamines and dialkylamines, eg. methylamine, ethylamine, propylamine, isopropylamine butylamine, isobutylamine, s-butylamine, dimethylamine, diethylamine, dipropylamine, dibutylamine, pyrrolidine, piperidine, morpholine and the like. The amines may contain additional functional groups, eg. hydroxyls, and may accordingly be, for example, alkanolamines in which the alkanol group is of 2 to 4 carbon atoms, eg. ethanolamine, isopropanolamine, 3-aminopropanol, diethanolamine, diisopropanolamine and the like.

Amines with a plurality of basic nitrogens may also by employed, eg. 3-dimethylaminopropylamine, 3-diethylaminoproprylamine, piperazine, N-methylpiperazine and the like. In general, low molecular weight amines are used, but those of relatively high molecular weight may also be employed, especially if the plasticizing action of these amines is desired. Mixtures of low molecular weight and relatively high molecular weight amines may also be employed.

If salts of tertiary amines are to be employed, these are preferably salts of amines of the general formula

where $R^3$ and $R^4$ have the above meanings and $R^5$ is methyl, ie. amines which contain at least one methyl. Examples include trimethylamine, dimethylethylamine, dimethylethanolamine, methyldiethanolamine and dimethyldecylamine. Such amines may be employed as salts of carbonic acid or of a carboxylic acid, eg. acetic acid, lactic acid, formic acid and the like.

If primary or secondary amines are employed it is advantageous—in order to avoid a Michael addition reaction of these amines with the α,β-olefinically unsaturated acid amide group, first to carry out the reaction of the epoxide compound with the amine and then to react the remaining epoxide groups with the phenol containing α,β-olefinically unsaturated amidomethyl groups. Both reactions can be carried out at slightly elevated temperatures, namely 30°–150° C., preferably 60°–90° C.

The amount of amine employed must at least suffice in order to render the finished binder water-dispersible after it has been partially or completely neutralized with an acid. In general, this requires at least 0.5 equivalent of amine per 1,000 g of solid binder, but up to 2 equivalents of amine per 1,000 g of binder may be employed.

The reaction of the amine with the polyepoxide compound can, where the latter compound is liquid at room temperature, be carried out in the absence of a solvent. However, it is also possible to use solvents, for example hydrocarbons, eg. benzene or toluene, alcohols, eg. isopropanol or isobutanol, ether-alcohols, eg. ethylene glycol monethyl ether, ketones, ethers, esters and the like. The amines may also be employed in the form of their carbonates, or carbon dioxide can be passed through the reaction vessel. This under certain circumstances helps to suppress undesirable side-reactions, such as auto-condensation of the polyepoxide compounds.

The amounts of polyepoxide compounds are chosen so that the epoxide groups not required for reaction with the amine suffice to give the desired molecular weight of the binder, through reaction with the phenolic OH groups of the monophenols and/or polyphenols possessing $\alpha,\beta$-olefinically unsaturated amidomethyl groups. The molecular weight of the binders is from about 500 to 10,000, preferably from 1,000 to 5,000. It is not necessary to react all phenolic OH groups with the epoxide groups but neither is it necessary to react all the epoxide groups. In general, the monophenols and/or polyphenols, possessing $\alpha,\beta$-olefinically unsaturated amidomethyl groups, the polyepoxides, and the amines or amine salts, are reacted in ratios, expressed as equivalents of phenolic hydroxyl to epoxide to amine, of from 15:16:1 to 1:2:1, preferably from 6:7:1 to 1:2:1.

The novel polyadducts may be diluted with conventional surface-coating solvents, such as alcohols of 3 to 16 carbon atoms, eg. isopropanol, decanol or n- or isobutanol, alkylaromatics, eg. toluene, cycloaliphatics, (oligomeric) glycols and glycol-ethers, or aqueous-organic solvent mixtures, and may or may not be mixed with pigments, fillers and conventional surface-coating auxiliaries. They are applied to the substrate to be coated or finished, eg. to wood, metal, glass or ceramic, by conventional coating methods, eg. spraying, dipping or flooding, and are dried, and cured at about 170° C. The coatings thus obtained exhibit, for example, great hardness and solvent resistance.

The novel polyadducts can also be advantageously cured by irradiation with infrared rays, ultraviolet rays or electron beams, in the presence or absence of reactive diluents, such as monoacrylates and diacrylates, and of conventional UV initiators advantageously employed in UV curing, eg. benzoin ethers or benzilketals.

Preferably, however, the novel surface-coating binders are employed after protonization with acids, for example phosphoric acid and its derivatives or, prerferably, water-soluble carboxylic acids, eg. acetic acid, formic acid or lactic acid. The protonized surface-coating binder can be diluted with water and can be used in the conventional coating methods mentioned above, again giving coatings having very valuable properties.

The preferred use of the novel protonized polyadducts is as surface-coating binders for the cathodic electrocoating of electrically conductive surfaces, for example of metal articles, sheets and the like made of brass, copper, aluminum, iron and steel, which may or may not have been chemically pretreated, for example phosphatized.

The aqueous solutions or dispersions of the novel polyadducts, which polyadducts are at least partially in the form of a salt with a water-soluble carboxylic acid, can also contain auxiliaries which can be deposited conjointly with the polyadducts by cathodic electrocoating, such as pigments, eg. carbon black, talc, titanium dioxide, kaolin, basic lead chromate, iron oxide and the like, soluble dyes, solvents, levelling agents, stabilizers, curing catalysts, anti-foam agents and other assistants and adjuvants.

The cathodic electrocoating bath is in general brought to a solids content of 5-30% by weight by dilution with demineralized water. The electrocoating is in general carried out at from 15° to 40° C. for from 1 to 2 minutes at a pH of from 4.0 to 8.5, preferably from 5.0 to 7.5, and at a deposition potential of from 50 to 500 volt. The film cathodically deposited on the electrically conductive article is rinsed and is then cured at about 140°-200° C. for from 10 to 30 minutes, preferably at 160°-180° C. for about 20 minutes.

The Examples which follow illustrate the invention without implying a limitation. Parts and percentages are by weight.

The section from here to the Examples relates to the preparation of polyphenols which possess groups of the general formula (I) (ie. phenols possessing $\alpha,\beta$-olefinically unsaturated amidomethyl groups, hereafter referred to, for brevity, as "intermediates"):

Intermediate 1

456 parts of bisphenol A and 303 parts of methylolacrylamide are dissolved in 456 parts of acetic acid at 50° C., the solution is then cooled to 15° C. and at this temperature HCl gas is introduced until saturation is reached. The temperature is then allowed to rise to 25° C. After 2 hours, the mixture is diluted with 2,000 parts of methylene chloride and is then extracted by shaking four times, with 2,000 parts of water at a time. Finally, it is extracted by shaking once with a solution of 100 parts of sodium carbonate in 2,000 parts of water, after which the organic phase is dried over sodium sulfate. After stripping off the solvent under reduced pressure at 80° C., a viscous, almost colorless material remains.

Intermediate 2

A mixture of 228 parts of bisphenol A, 177.5 parts of acrylamide, 75 parts of paraformaldehyde, 0.5 part of toluenesulfonic acid and 230 parts of isobutanol is heated to the reflux point, whilst stirring, and 30 parts of water are then removed in the course of 2 hours by fitting a water separator. 72 parts of isobutanol are then distilled off, the temperature in the reaction vessel rising to 140° C. The residue is cooled and diluted with 90 parts of fresh isobutanol. The product has a solids content of 67%.

Intermediate 3

1 part of toluenesulfonic acid is added to a mixture of 228 parts of bisphenol A, 106.5 parts of acrylamide, 45 parts of paraformaldehyde and 230 parts of isobutanol, and the batch is heated to the reflux point, whilst stirring. 20 parts of water are then removed in the course of 2 hours, using a water separator.

Intermediate 4

114 parts of bisphenol A and 150 parts of toluene are heated to 80° C. and 76 parts of methylolacrylamide and 0.5 part of toluenesulfonic acid are then added. The mixture is heated to the reflux point. Thereafter, about 13.5 parts of water are removed over 90 minutes using a water separator. This gives a two-phase product, from which 55 parts of upper phase, consisting of almost pure toluene, are decanted.

Intermediate 5

The procedure followed is as described for the preparation of Intermediate 1; however, in place of 456 parts of bisphenol A, 500 parts of dihydroxydiphenylsulfone are used. After having been saturated with hydrochloric acid, the mixture is heated for 6 hours at 65° C. During the extraction by shaking with water, a small amount of acetone is added as a solubilizer.

EXAMPLE 1

1,255 parts of a commercial epoxy resin (diglycidyl ether obtained from bisphenol A and epichlorohydrin) having an epoxide equivalent weight of 189 are diluted with 164 parts of isopropanol and heated to 60° C. 220 parts of diethanolamine are added dropwise over one hour, whilst keeping the temperature at 60°–65° C. by occasional cooling. The mixture is then stirred for 2 hours at 60° C. 95 parts of Intermediate 1 and 55 parts of isobutanol are added to 187.5 parts of the product obtained, and the mixture is heated at 80° C. until the viscosity, measured at 75° C. using a plate-and-cone viscometer, is 4,000 mPa.s; this requires about 4 hours. 12 parts of acetic acid and 100 parts of water are then added and the mixture is stirred. The solids content of the resin solution is 58%. An electrocoating bath having a solids content of 10% and a pH of 5.4 is prepared from this product by adding demineralized water. To improve levelling, 10 parts of ethylhexanol per liter of coating bath are added. Then the bath is stirred for 24 hours at 25° C.

Steel sheets which have been phosphatized with zinc phosphate, rinsed with water and dried in air are cathodically coated in this bath for 2 minutes at 180 V/25° C., and the coating is then baked for 20 minutes at 180° C. The coating thickness is 15 μm. An examination of the corrosion by the ASTM salt spray test (DIN SS 50,021) shows less than 1 mm penetration from the incision after 336 hours.

EXAMPLE 2

1,255 parts of the epoxy resin used in Example 1 are diluted with 164 parts of isopropanol and 16 parts of water. 220 parts of diethanolamine are added dropwise over 1 hour at 60° C., and at the same time carbon dioxide is passed through the solution. The mixture is then stirred for 2 hours at 60°–62° C.

375 parts of the product are mixed with 336 parts of Intermediate 2 and 96.5 parts of isopropanol and the mixture is heated at 80° C. until the viscosity, measured at 75° C. using a plate-and-cone viscometer, is 4,000 mPa.s; this requires about 6 hours. 25 parts of acetic acid and 150 parts of water are then added. The product has a solids content of about 58%. An electrocoating bath having a solids content of 10% and a pH of 5.4 is prepared therefrom by adding 60 parts of ethylhexanol and 4,650 parts of demineralized water. Zinc-phosphatized steel sheets which have not been after-treated with chromic acid, as well as non-phosphatized bright steel sheets, are cathodically coated for 2 minutes at 260 V and 25° C., and the coating is baked for 20 minutes at 180° C. The thickness of the coating is 11 μm on zinc-phosphatized sheet and 20 μm on the bright sheet. Examination of the corrosion by the ASTM salt spray test (DIN SS 50,021) shows, after 480 hours, a penetration of 1 mm from the incision in the case of the phosphatized sheet and of 3 mm in the case of the bright sheet.

EXAMPLE 3

786 parts of the reaction product of epoxy resin and diethanolamine used in Example 2, and 108 parts of isopropanol, are added to 590 parts of Intermediate 3, and the mixture is heated at 75° C. until the viscosity, measured at 75° C., has risen to 4,000 mPa.s, which requires about 4 hours. 50 parts of acetic acid and 500 parts of water are then added.

25 parts of a black paste as described in German Published Application DAS No. 2,606,831, Example 1b, and 10 parts of ethylhexanol are added to 196 parts of this mixture and the bath is made up to 1,000 parts with water. It is then stirred overnight at 25° C. Zinc-phosphatized steel sheets and raw steel sheets are coated for 2 minutes at 230 V and 25° C. and the coating is baked for 20 minutes at 180° C. The ASTM salt spray test shows, after 240 hours, a penetration of 0–1 mm of the 15 μm thick coating on phosphatized sheets, and a penetration of 1 mm of the 16–17 μm thick coating on raw sheets.

We claim:

1. A polyadduct, which possesses nitrogen-basic groups, has a mean molecular weight of from 500 to 10,000, and contains groups, attached to aromatic rings, of the formula (I)

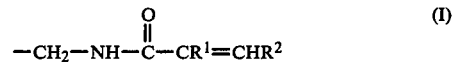

where $R^1$ and $R^2$ are identical or different and each is hydrogen or methyl, which polyadduct has been prepared from a monophenol and/or polyphenol which possesses groups of the formula (I), a polyepoxide compound and an amine or amine salt.

2. A polyadduct as claimed in claim 1, which has been prepared from a monophenol and/or polyphenol, possessing groups of the general formula (I), which is a reaction product of a monophenol and/or polyphenol and a compound of the general formula (II)

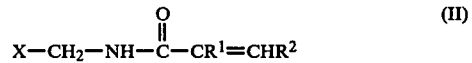

where X is OH, halogen or alkoxy of 1 to 8 carbon atoms and $R^1$ and $R^2$ are identical or different and each is hydrogen or methyl.

3. A polyadduct as claimed in claim 2, which has been prepared from N-methylolacrylamide or N-methylolmethacrylamide as the compound of the general formula (II).

4. A polyadduct as claimed in claim 3, which has been prepared from a mixture of acrylamide or methacrylamide and formaldehyde or a formaldehyde donor in the presence of an acidic catalyst, this mixtue taking the place of the N-methylolacrylamide or N-methylolmethacrylamide.

5. A polyadduct as claimed in claim 2, wherein 2,2-bis-p-hydroxyphenyl-propane (bisphenol A) is used for the production of the polyphenol having groups of the general formula I.

6. A polyadduct as claimed in claim 1, which has been prepared from a diglycidyl ether of bisphenol A, obtained from bisphenol A and epichlorohydrin, as the polyepoxide compound.

7. A process for coating an article which comprises applying to the article a solution or dispersion of a polyadduct as set forth in claim 1, and thereafter irradiating or heating the coated article to cure the polyadduct.

8. A process as set forth in claim 7, wherein the polyadduct is protonized with an acid and the coating composition is applied to the article by cathodic electrocoating.

9. A coating composition comprising a polyadduct as set forth in claim 1 and a solvent for said polyadduct.

10. A coating composition for the cathodic electrocoating of metal articles which comprises an aqueous solution or dispersion of a protonized polyadduct as set forth in claim 1.

* * * * *